(12) United States Patent
Hirn et al.

(10) Patent No.: US 12,535,470 B2
(45) Date of Patent: Jan. 27, 2026

(54) LAMP-HOUSING ASSEMBLY WITH AXIALLY AND RADIALLY ALIGNED AND ELECTRICALLY COUPLED ELEMENTS

(71) Applicant: Agilent Technologies, Inc., Santa Clara, CA (US)

(72) Inventors: Christian Hirn, Waldbronn (DE); Christoph Keppler, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 547 days.

(21) Appl. No.: 18/084,415

(22) Filed: Dec. 19, 2022

(65) Prior Publication Data

US 2023/0243788 A1   Aug. 3, 2023

(30) Foreign Application Priority Data

Jan. 28, 2022   (GB) .................................... 2201122

(51) Int. Cl.
   *G01N 30/74*   (2006.01)
   *B01D 15/14*   (2006.01)
   (Continued)

(52) U.S. Cl.
   CPC ............. *G01N 30/74* (2013.01); *B01D 15/14* (2013.01); *B01D 15/166* (2013.01);
   (Continued)

(58) Field of Classification Search
   None
   See application file for complete search history.

(56) References Cited

U.S. PATENT DOCUMENTS

| 3,923,663 A | 12/1975 | Reid |
| 4,971,687 A | 11/1990 | Anderson |

(Continued)

FOREIGN PATENT DOCUMENTS

| EP | 1577012 A1 | 9/2005 |
| JP | 2002110100 A | 4/2002 |

(Continued)

OTHER PUBLICATIONS

UK Intellectual Property Office Combined Search and Examination Report Under Sections 17 and 18(3) dated Jul. 28, 2022 for Application No. GB2201122.5; 11 pages.

(Continued)

*Primary Examiner* — Eric S. McCall
*Assistant Examiner* — Nigel H Plumb

(57) ABSTRACT

A lamp-housing assembly includes a lamp seat with a first contact member, a lamp with axially opposite first and second electric terminals, and a lamp cap with a second contact member. The lamp is insertable into the lamp seat. The lamp cap is mountable on the lamp seat and the inserted lamp. Inserting the lamp into the lamp seat establishes an electric coupling of the first electric terminal with the first contact member. Mounting the lamp cap on the lamp seat and inserted lamp establishes an electric coupling of the second electric terminal with the second contact member. The lamp seat, lamp and lamp cap are matched such that, after insertion and mounting, the lamp is axially and radially aligned and electrically and thermally coupled with the lamp seat and the lamp cap. The assembly may be utilized for a detector of a fluidic sample separation apparatus.

19 Claims, 5 Drawing Sheets

(51) Int. Cl.
*B01D 15/16* (2006.01)
*B01D 15/24* (2006.01)
*B01D 19/00* (2006.01)
*G01N 30/14* (2006.01)
*G01N 30/02* (2006.01)

(52) U.S. Cl.
CPC ....... *B01D 15/247* (2013.01); *B01D 19/0068* (2013.01); *G01N 30/14* (2013.01); *G01N 2030/027* (2013.01)

(56) References Cited

U.S. PATENT DOCUMENTS

| | | | |
|---|---|---|---|
| 5,568,007 A | | 10/1996 | Yamura et al. |
| 5,573,666 A | * | 11/1996 | Korin ............... C02F 1/325 |
| | | | 210/232 |
| 5,597,482 A | * | 1/1997 | Melyon ............. C02F 1/325 |
| | | | 210/260 |
| 5,843,309 A | | 12/1998 | Mancil |
| 5,935,431 A | | 8/1999 | Korin |
| 7,002,285 B2 | | 2/2006 | Mudra et al. |
| 10,746,361 B2 | | 8/2020 | Park et al. |
| 2002/0014461 A1 | * | 2/2002 | Kuennen ............ H01J 61/20 |
| | | | 210/748.11 |
| 2012/0235563 A1 | | 9/2012 | Ito et al. |

FOREIGN PATENT DOCUMENTS

| | | |
|---|---|---|
| JP | 2006012621 A | 1/2006 |
| WO | 9937978 A1 | 7/1999 |
| WO | 2006074329 A2 | 7/2006 |
| WO | 2014104012 A1 | 7/2014 |
| WO | 2017120574 A1 | 7/2017 |
| WO | 2020167698 A | 8/2020 |

OTHER PUBLICATIONS

Intellectual Property Office Search Report under Section 17 (6) for application No. GB2201122.5 dated Apr. 19, 2023; 4 pages.
UK Intellectual Property Office Combined Search and Examination Report under Sections 17 and 18(3) dated Jun. 30, 2025; 5 pages.

* cited by examiner

LAMP-HOUSING ASSEMBLY WITH AXIALLY AND RADIALLY ALIGNED AND ELECTRICALLY COUPLED ELEMENTS

RELATED APPLICATIONS

This application claims priority to UK Application No. GB 2201122.5, filed Jan. 28, 2022, the entire contents of which are incorporated herein by reference.

TECHNICAL FIELD

The present invention relates to lamp assemblies, a lamp, a detector, a sample separation apparatus, and a method of assembling a lamp-housing assembly.

BACKGROUND

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. Thereafter, an injector valve is switched so as to introduce the intaken amount of fluidic sample from the sample loop of a metering path into the separation path between the fluid drive unit and the separation unit for subsequent separation. As a result, the fluidic sample is injected into the mobile phase, such as a solvent or a solvent composition. After separation, the separated fluidic sample may be detected in a detector with a flow cell. The separated fluidic sample flows through the flow cell and is illuminated by light from a light source while being optically detected by the detector.

However, handling of a lamp-housing assembly including a lamp for providing the above-mentioned light may be difficult, cumbersome and even dangerous for a user.

SUMMARY

It is an object of the present disclosure to enable a simple, safe and failure robust handling of a lamp-housing assembly, in particular for providing light in a detector of a sample separation apparatus.

According to an exemplary embodiment of a first aspect of the present disclosure, a lamp-housing assembly for a detector of a sample separation apparatus for separating a fluidic sample is provided, wherein the lamp-housing assembly comprises a lamp seat, a lamp insertable into the lamp seat, and a lamp cap mountable on the lamp seat and on the inserted lamp, wherein the lamp seat, the lamp and the lamp cap are matched with respect to each other so that, by inserting the lamp into the lamp seat and by mounting the lamp cap on the lamp seat and on the inserted lamp, the lamp is axially and radially aligned and electrically and thermally coupled with the lamp seat and the lamp cap.

According to another exemplary embodiment of the first aspect of the present disclosure, a method of assembling a lamp-housing assembly having the above mentioned features for a detector of a sample separation apparatus for separating a fluidic sample is provided, wherein the method comprises inserting the lamp into the lamp seat, mounting the lamp cap on the lamp seat and on the inserted lamp, and matching the lamp seat, the lamp and the lamp cap with respect to each other so that, by inserting the lamp into the lamp seat and by mounting the lamp cap on the lamp seat and on the inserted lamp, the lamp is axially and radially aligned and electrically and thermally coupled with the lamp seat and the lamp cap.

According to an exemplary embodiment of a second aspect of the present disclosure, a lamp for a detector of a sample separation apparatus for separating a fluidic sample is provided, wherein the lamp comprises a lamp body, a first electric terminal and a second electric terminal at axially opposing ends of the lamp body, and a thermally conductive and electrically insulating flange member arranged on the lamp body for enhancing an electric isolation of the first electric terminal with respect to the second electric terminal and configured for removing heat from the lamp body.

According to an exemplary embodiment of a third aspect of the present disclosure, a lamp-housing assembly for a detector of a sample separation apparatus for separating a fluidic sample is provided, wherein the lamp-housing assembly comprises a lamp seat, a lamp insertable into the lamp seat, and a lamp cap mountable on the lamp seat and on the inserted lamp, wherein a lamp seat-sided portion of the lamp and a lamp cap-sided portion of the lamp are arranged in different separated accommodation volumes defined by the lamp seat and/or by the lamp cap, and wherein the lamp seat-sided portion is arranged in an accommodation volume which is divided into at least two convection-inhibited separated staggered chambers.

According to still another exemplary embodiment of the first aspect and/or the second aspect and/or the third aspect, a detector for a sample separation apparatus for separating a fluidic sample is provided, wherein the detector is configured for detecting the separated fluidic sample and comprises a lamp-housing assembly having the above-mentioned features and/or a lamp having the above mentioned features.

According to still another exemplary embodiment of the first aspect and/or the second aspect and/or the third aspect, a sample separation apparatus for separating a fluidic sample is provided, wherein the sample separation apparatus comprises a fluid drive configured for driving the fluidic sample and/or a mobile phase in which the fluidic sample is injected, a sample separation unit for separating the fluidic sample in the mobile phase, and a lamp-housing assembly having the above mentioned features, a lamp having the above mentioned features and/or a detector having the above mentioned features.

In the context of the present application, the term "lamp-housing assembly" may particularly denote an arrangement of a plurality (in particular at least three) members cooperating to provide the function of emitting light in a spectrally and/or spatially definable way when the lamp is supplied with electric power.

In the context of the present application, the term "lamp seat" (which may also be denoted as lamp-housing body) may particularly denote a base portion or base member of a lamp-housing assembly having an accommodation volume (such as a recess) for accommodating at least part of a lamp. One electric terminal of the lamp may be electrically connected with a counter terminal of the lamp seat when accommodated in the lamp seat.

In the context of the present application, the term "lamp" may particularly denote a member configured for generating light when supplied with electric power. The mentioned light may have any appropriate wavelength or wavelength range, for instance may comprise visible light, ultraviolet light and/or infrared light.

In the context of the present application, the term "lamp cap" (which may also be denoted as lamp cap assembly) may particularly denote a lid or a cover portion or member of a lamp-housing assembly having an accommodation volume (such as a recess) for accommodating at least part of a lamp. One electric terminal of the lamp may be electrically connected with a counter terminal of the lamp cap when covered by the lamp cap.

In the context of the present application, the term "axially and radially aligned" may particularly denote that both an axial position and/or orientation as well as a radial position and/or orientation of the lamp in the lamp seat and in the lamp cap is well-defined in an assembled condition of the lamp-housing assembly. In this context, an axial direction may correspond to an insertion direction of the lamp in the lamp seat and/or in the lamp cap. Furthermore, a radial direction may correspond to any direction in a plane perpendicular to said insertion direction.

In the context of the present application, the term "lamp seat-sided portion of the lamp" may particularly denote a portion of the lamp accommodated in the lamp seat. Said lamp seat-sided portion of the lamp may include in particular a light emitting portion of the lamp at which the actual emission of electromagnetic radiation, i.e. light, occurs. Such a light emitting portion of the lamp may be surrounded at least partially by an optically transparent shell enabling the transmission of generated light. However, the lamp seat-sided portion of the lamp may extend up to a proximal end of the lamp, where for instance an electric terminal of the lamp may be arranged.

In the context of the present application, the term "lamp cap-sided portion of the lamp" may particularly denote a portion of a lamp facing or arranged inside of a lamp cap in an assembled state. The lamp cap-sided portion of the lamp may extend up to a distal end of the lamp, where for instance an electric terminal of the lamp may be arranged.

In the context of the present application, the term "convection-inhibited separated staggered chambers" may particularly denote at least two hollow volumes which may be arranged in a stacked manner and which may be spatially separated and only weakly thermally coupled so that the heat transfer mechanism of convection between the staggered chambers is strongly suppressed. Convection (or convective heat transfer) may denote the transfer of heat from one place to another due to the movement of fluid, in particular gas. For example, a heat transfer by convection may be reduced at least by 50%, in particular at least by 90%, by the convection-inhibited separated staggered chambers in comparison with a lamp-housing assembly which does not have convection-inhibited separated staggered chambers. The convection-inhibited separated staggered chambers may even be convection-decoupled, so as to completely decouple said chambers from each other what concerns convection-type heat transfer.

In the context of the present application, the term "lamp body" may particularly denote a functional and structural subassembly of the lamp which has an electric interface for receiving electric power and which is configured for generating light when providing electric power to the lamp body.

In the context of the present application, the term "electric terminal" may particularly denote an electrically conductive contact at which electric power may be applied to the lamp or from which electricity may be drained from the lamp.

In the context of the present application, the term "flange member" may particularly denote an annular member accommodating a lamp body in its central opening with intimate contact in between. Flange member and lamp body may be separate bodies being fixed to each other (for example by gluing or clamping), or may be integrally formed. At the same time, the flange member may have the function of a flange with respect to lamp seat and/or lamp cap. For example, the flange member may have a protruded ridge, lip or rim that may serve for an easy attachment or transfer of contact force with another object (i.e. lamp seat and/or lamp cap), and/or for stabilizing and guiding the movements of the parts of the lamp-housing assembly.

In the context of the present application, the term "thermally conductive and electrically insulating" may particularly denote a property of the flange member being configured for conducting heat (in particular by heat conduction, also denoted as thermal conduction) but being incapable of transporting electricity (i.e. being dielectric). For instance, the thermal conductivity of the thermally conductive material may be at least 5 W/mK, in particular at least 20 W/mK, preferably at least 50 W/mK. Examples for thermally conductive and electrically insulating materials are ceramics, such as aluminum oxide or aluminum nitride.

In the context of this application, the term "sample separation apparatus" may particularly denote any apparatus which is capable of separating different fractions of a fluidic sample by applying a certain separation technique, in particular liquid chromatography.

In the context of the present application, the term "detector" may particularly denote a member of a sample separation apparatus which detects a separated fluidic sample, in particular separated fractions of the fluidic sample. In an embodiment, the detector is a fluorescence detector. In particular, the detector may comprise a flow cell through which the separated fluidic sample flows and which is illuminated by light generated by the lamp or lamp-housing assembly. Such a detector may be an optical detector, for instance a fluorescence detector. Such a detector may comprise a light source which can be embodied as a lamp-housing assembly of an exemplary embodiment of the present disclosure. Light created by such a lamp-housing assembly may be guided to the separated fluidic sample flowing in a flow cell. After interaction between said primary light and the separated fluidic sample, secondary light may propagate from the fluidic sample in the flow cell to a detecting unit, such as a photocell, a linear array of photocells or a two-dimensional array of photocells.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Separation of a fluidic sample into fractions may involve a certain separation criterion (such as mass, volume, chemical properties, etc.) according to which a separation is carried out.

In the context of this application, the term "mobile phase" may particularly denote any liquid and/or gaseous medium which may serve as fluidic carrier of the fluidic sample during separation. A mobile phase may be a solvent or a solvent composition (for instance composed of water and an organic solvent such as ethanol or acetonitrile). In an isocratic separation mode of a liquid chromatography apparatus, the mobile phase may have a constant composition over time. In a gradient mode, however, the composition of the mobile phase may be changed over time, in particular to desorb fractions of the fluidic sample which have previously been adsorbed to a stationary phase of a separation unit.

In the context of the present application, the term "fluid drive" may particularly denote an entity capable of driving a fluid (i.e. a liquid and/or a gas, optionally comprising solid particles), in particular the fluidic sample and/or the mobile phase. For instance, the fluid drive may be a pump (for instance embodied as piston pump or peristaltic pump) or another source of high pressure. For instance, the fluid drive may be a high-pressure pump, for example capable of driving a fluid with a pressure of at least 100 bar, in particular at least 500 bar. Additionally or alternatively, a motion of the mobile phase can also be triggered by an electrostatic force.

In the context of the present application, the term "sample separation unit" may particularly denote a fluidic member through which a fluidic sample is transferred, and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample.

According to an exemplary embodiment of the first aspect of the present disclosure, a lamp-housing assembly for a detector of a sample separation apparatus is provided, in which a lamp seat, a light-emitting lamp and a lamp cap are provided with matching geometries for ensuring that by merely placing the lamp in an accommodation volume of the lamp seat and by subsequently covering a protruding portion of the lamp by the lamp cap, all mentioned members of the lamp-housing assembly are properly aligned both in an axial and in a radial direction. Hence, such a lamp-housing assembly can be handled very easily by an operator in a toolless way and using only one hand. Consequently, a well-defined arrangement of the lamp in the lamp-housing assembly can be ensured which leads to reproducible results when using the lamp-housing assembly for a detector of a sample separation apparatus. Moreover, lamps (such as high-voltage gas discharge lamps) being suitable for fluorescence detectors of a sample separation apparatus (such as an HPLC) have to be handled with due care, since damage of such a lamp during handling may cause severe danger of injury for a user. With the described matching arrangement of lamp seat, lamp and lamp cap, a very intuitive and simple assembly is made possible and the danger of injury can be strongly suppressed. Simultaneously with establishing a mechanical connection between lamp seat, lamp and lamp cap, also an electric connection between cooperating electric terminals of lamp seat, lamp and lamp cap is formed, so that no additional measures need to be taken for electrically connecting the lamp.

According to an exemplary embodiment of the second aspect of the present disclosure, a lamp body of a (in particular high-voltage) lamp for a detector of a sample separation apparatus is provided with electric terminals at axially opposing ends which simplifies the establishment of an electric connection at one end with a lamp seat and at the axially opposing other end with a lamp cap. Advantageously, surrounding such a lamp body with a thermally conductive and electrically insulating flange member may contribute to a highly efficient heat removal from the lamp-housing assembly parts during operation thereof. Hence, overheating may be strongly suppressed by the flange member which removes a significant amount of heat by heat conduction in a directed and therefore well-defined way. At the same time, the dielectric property of the flange member increases the robustness of the lamp against a short-circuit fault due to creeping current propagating between opposing terminals of the lamp. Synergistically, the thermally conductive and electrically insulating flange member may also contribute to an aligned assembly of the lamp between a lamp seat and a lamp cap.

According to an exemplary embodiment of the third aspect of the present disclosure, a lamp seat, a lamp in the lamp seat and a lamp cap on the lamp seat and on the inserted lamp may be configured so that a lamp seat-sided portion of the lamp emitting light during operation and being located at least partially in the lamp seat in an assembled state is located inside an accommodation volume which is different from another accommodation volume in which a top portion of the lamp, i.e. a lamp cap-sided portion, is located. This design may contribute to a reliable prevention of overheating. In particular, care should be taken that a bottom portion of the lamp comprising the light-emitting portion is not overheated during operation. In order to achieve this, it has turned out as advantageous to divide the accommodation volume of the bottom portion of the lamp (which may comprise the light-emitting portion) into two or more convection-inhibited separated staggered chambers. Descriptively speaking, by suppressing convection between said chambers, which may be stacked on top of each other, excessive flow of heat deep into the lamp seat may be reduced. Descriptively speaking, convection from chamber to chamber may be suppressed or inhibited by thermally separating the chambers from each other. For instance, one or more bottlenecks may be created between adjacent chambers, wherein the lamp body may be guided through said at least one bottleneck. Preferably, only a very small gap remains between adjacent chambers and the lamp body. Overheating of the bottom portion of the lamp-housing assembly may then be reliably prevented. In particular, the described concept of suppressing heat convection deep inside the lamp seat may protect a base-sided electric terminal of the lamp against overheating.

Exemplary embodiments relating to the first aspect, the second aspect and the third aspect may be implemented independently from the respectively other aspects of the present disclosure. It is however particularly preferred to combine exemplary embodiments relating to the first aspect and/or the second aspect and/or the third aspect of the present disclosure.

In the following, further embodiments of the lamp assemblies, the lamp, the detector, the sample separation apparatus, and the method will be explained.

In an embodiment, the lamp comprises a lamp body, and a first electric terminal and a second electric terminal at axially opposing ends of the lamp body. Such a configuration is advantageous for high-voltage lamps to keep the distance between the electric terminals long to thereby suppress the risk of short-circuit faults by creepage current.

In an embodiment, the lamp comprises a thermally conductive and electrically insulating flange member arranged on the lamp body for enhancing an electric isolation of the first electric terminal with respect to the second electric terminal, and configured for removing heat from the lamp body. The dielectric and thermally conductive flange member may both enhance electric decoupling between opposing electric terminals of the lamp body while at the same time removing heat (both in a lateral and in an axial direction) created by the lamp body when emitting light.

In an embodiment, the flange member comprises or consists of a ceramic. Ceramic materials are highly appropriate for the flange member, since they show a reliable dielectric behaviour while simultaneously conducting heat in an efficient way. The use of a ceramic for the flange member has a further advantage: A ceramic may have a relatively low CTE (coefficient of thermal expansion) value, so that in the event of changing a lamp, the previously implemented lamp will cool down rapidly so that the lamp changing operation can be executed quickly. For instance, aluminum nitride, aluminum oxide, silicon oxide or silicon nitride may be used as a ceramic.

In an embodiment, the flange member comprises a sleeve section surrounding at least part of the lamp body and a disc-shaped section, in particular integrally formed with the sleeve section, providing at its bottom side a mounting surface to rest on the lamp seat. The sleeve section may ensure a proper thermal coupling between flange member and lamp body over a large thermal coupling area. The disc-shaped section may further distribute the heat in a lateral way, while also taking care on a bottom side for establishing a physical contact with the lamp seat and on a top side for establishing a physical contact with a lamp cap. Integrally forming sleeve section and disc-shaped section may improve the thermal coupling efficiency in between. For example, the disc-shaped section may be directly connected to an axial end of the sleeve section. Preferably, the sleeve section may have a convex portion at its exterior surface for improving the self-alignment property of the lamp-housing assembly.

In an embodiment, the flange member rests on the lamp seat at a vertical position above the first electric terminal and below the second electric terminal. With such a geometrical arrangement, in particular a laterally extended portion (such as a disk-shaped section) of the flange member may form a bottom surface resting on the lamp seat above a bottom electrode of the lamp and may form a top surface on which the lamp cap rests below a top electrode of the lamp. Hence, the described geometry may ensure excellent properties both in terms of electric safety and heat spreading.

In an embodiment, the lamp seat, the lamp and the lamp cap are configured so that inserting the lamp into the lamp seat and mounting the lamp cap on the lamp and on the lamp seat establishes simultaneously an electric coupling of the first electric terminal and the second electric terminal with contact members, in particular with contact members in form of annular contact springs, of the lamp seat and of the lamp cap. Thus, a user only has to care for establishing a correct mechanical connection between lamp seat, lamp and lamp cap, and all electrical connections will be established simultaneously and automatically. This improves user-friendliness of the lamp-housing assembly and reduces the risk of damage of the (potentially dangerous) lamp-housing assembly.

In an embodiment, the flange member, the lamp seat and/or the lamp cap is or are configured so that, by inserting the lamp into the lamp seat and by mounting the lamp cap on the lamp seat and on the inserted lamp, a continuous and well-defined thermally conductive path is established between the flange member and at least one of the lamp seat and the lamp cap. In particular, the mutual configuration of the mentioned members of the lamp-housing assembly may be such that heat is removed from an interior of the lamp-housing assembly along a predefined thermal path. This may allow to efficiently prevent hotspots in an interior of the lamp-housing assembly.

In an embodiment, the flange member has an engagement structure and the lamp seat has a matching further engagement structure, so that a mutual engagement between the engagement structure and the further engagement structure upon inserting the lamp into the lamp seat fixes the lamp at the lamp seat in a target angular position. For example, the engagement structure of the flange member may be a notch or other kind of recess, whereas the further engagement structure of the lamp seat may be a protrusion engaging into the notch or other kind of recess of the flange member in an assembled state, or vice versa. By locating the engagement structure of the flange member at a certain circumferential position of the flange member, a mounting of the lamp in an inappropriate circumferential orientation may be mechanically disabled. Thus, the cooperating engagement structures may also contribute to an error-free assembly and to a self-alignment of the lamp-housing assembly. Only when the engagement structures are in mutual engagement, the lamp cap may be assembled on top of the lamp, otherwise there will be a mechanical barrier indicating to a user in an intuitive way that the lamp-housing assembly is not yet corrected mounted.

In an embodiment, the lamp seat comprises a bottom-sided set of annular contact springs (in particular embodied as spring collar) configured for establishing an electric connection with the first electric terminal when inserting the lamp into the lamp seat. On the bottom side, the lamp may be forced to a correct position when inserted into the lamp seat. A radially fixing biasing force may be applied by the set of annular contact springs, thereby pre-fixing the assembled lamp in a clamping way. Advantageously, the bottom-sided set of annular contact springs provides a prefixing in combination with the establishment of a bottom-sided electric connection between lamp seat and lamp. Descriptively speaking, the bottom-sided set of annular contact springs may exert a fastening force to an inserted lamp, which is therefore prevented from falling out of an accommodation volume of the lamp seat. An annular circumferential arrangement of contact springs has the further advantage that a radially symmetric force pattern is applied to hold the lamp, while no net radial force results.

In an embodiment, the lamp cap comprises a top-sided set of annular contact springs (in particular embodied as spring collar) configured for establishing an electric connection with the second electric terminal when mounting the lamp cap on the lamp seat and on the lamp. On the top side, the lamp may be forced to a correct position when covered by the lamp cap. A fixing force may be applied by the top-sided set of annular contact springs, thereby finally fixing the assembled lamp in a clamping way. Advantageously, the top-sided set of annular contact springs provides a final fixing in combination with the establishment of a top-sided electric connection between lamp cap and lamp.

In particular the combination of the described bottom-sided set of annular contact springs and the described top-sided set of annular contact springs is highly advantageous, since this ensures the formation of a complete electric contacting of the lamp, rendering it fully operative.

In an embodiment, the lamp-housing assembly is configured as high-voltage lamp, in particular as gas discharge lamp. A high-voltage lamp may be a lamp requiring a high voltage for being operated, for example at least 1 kV (for instance for ignition). A gas-discharge lamp may be a light source that generates light by an electric discharge through an ionized gas, in particular a plasma. Such a high-voltage lamp, in particular gas discharge lamp, is highly appropriate for an HPLC-detector, since it is capable of providing a high intensity (wherein a high light intensity leads to a high sensitivity of a detector using a corresponding lamp), an appropriate wavelength range, and a sufficiently flat spectral profile. However, such high-voltage and/or gas discharge lamps may be dangerous during handling, since they may break easily and may even explode, thereby not only involving the risk of injury of a user but also exposing biohazardous materials, such as mercury. Thus, the self-aligning, electrical safety and overheating-protected configuration of lamp assemblies according to exemplary embodiments of the present disclosure may be of utmost advantage. Since such dangerous gas discharge lamps are usually required to be handled with protection gloves and protection mask for safety reasons, the simple (in particular single-handed and/or toolless) handling according to exemplary embodiments of the present disclosure is particularly advantageous.

In an embodiment, the lamp seat and the lamp are formed with matching shape so that inserting the lamp in the lamp seat leads to a self-alignment between the lamp seat and the lamp. Hence, an erroneous assembly by a user may be mechanically excluded by a form closure between lamp seat and lamp when the assembly is correct.

In an embodiment, the lamp-housing assembly comprises a force-controlling biasing element, in particular configured as biasing spring, configured for biasing the flange member, in particular for applying an axial preload to the flange member. A purpose of the force-controlling biasing element is the provision of an axial preload for the lamp flange. A force on the bayonet is a result of this. Such a force-controlling biasing element may inhibit excessive forces acting on the lamp-housing assembly, and may thereby suppress the risk of damage upon assembly of the constituents of the lamp-housing assembly.

In an embodiment, the lamp seat and the lamp cap are configured to be connectable with each other by a bayonet mechanism, bayonet mount or bayonet connector. In particular, a bayonet mechanism, bayonet mount or bayonet connector may denote a fastening mechanism comprising a cylindrical male side with one or more radial pins, and a female receptor with one or more matching (in particular L-shaped) slots and optionally with one or more springs to keep the two parts (i.e. lamp seat and lamp cap) locked together. The slots may be shaped like a capital letter L, optionally with a short upward segment at the end of the horizontal arm. The pin may, slide into the vertical arm of the L, may rotate across the horizontal arm, and may then be pushed slightly upwards into the short upward segment by a spring, so that the connector is no longer free to rotate unless pushed down against the spring until the pin is out of the upward segment. Advantageously, such a bayonet mechanism may be operated by a user manually without tools, so that it may further facilitate the mounting process of the lamp-housing assembly. In particular, the provision of a bayonet mechanism may render screws dispensable, so that there will be no risk of sheared off metallic chipping (which can be problematic in view of electric reliability). Furthermore, a screwless lamp-housing assembly of an exemplary embodiment of the present disclosure may be assembled and disassembled without tools.

While a bayonet mechanism is a preferred embodiment, other fastening mechanisms for fastening lamp seat and lamp cap may be implemented in other embodiments. For example, another appropriate fastening mechanism may combine an undercut in one of the lamp seat and the lamp cap with a connection pin or other protrusion in the other one of the lamp seat and the lamp cap.

In an embodiment, at least one of the lamp seat and lamp cap has one or more cooling openings for enabling a flow of cooling fluid (such as air) through the lamp-housing assembly. Preferably, the flange member, the lamp seat and/or the lamp cap may be configured so that thermal energy created by the lamp is dissipated along a continuous thermally conductive path and through the one or more cooling openings towards the environment. In particular, the lamp cap may be provided with such cooling openings so that heat created by the lamp during emitting light and moving in an upward direction inside of the lamp-housing assembly can be removed from the lamp-housing assembly by a cooling fluid (such as air) flowing from an exterior of the lamp cap through a cooling opening into the lamp cap and from there through a further cooling opening out of the lamp cap. Such a mechanism may contribute efficiently to heat removal out of the lamp-housing assembly and may thereby efficiently suppress undesired overheating. Descriptively speaking, a cooling architecture of a lamp-housing assembly according to an exemplary embodiment of the present disclosure may be based on the combination of predominant heat conduction in a bottom portion of the lamp-housing assembly with enforced heat convection in an upper portion of the lamp-housing assembly.

In an embodiment, the lamp-housing assembly comprises a cooling body (in particular comprising cooling fins) integrally formed with the lamp seat or coupled with the lamp seat for removing heat. For instance, such a cooling body or cooling portion of the lamp seat may comprise one or a plurality of cooling fins extending at an exterior side of the lamp-housing assembly. Heat created by the lamp during generating light may also be conducted towards an exterior of the lamp-housing assembly and can be efficiently dissipated to an environment via cooling fins having a large surface for enhancing thermal exchange.

In an embodiment, the lamp cap comprises an operation lever operable by a user for assembling or disassembling the lamp cap with respect to the lamp seat. For example, such an operation lever may be manually operated by a user with one hand, were turning the operation lever may open a bayonet mechanism (or another connector mechanism) connecting lamp seat with lamp cap. Hence, an operation lever extending radially from the lamp cap may ensure a simple and intuitive operation while simultaneously protecting a user's hand against heat of the lamp-housing assembly.

In an embodiment, the lamp seat, the lamp and the lamp cap are configured so that assembly and/or disassembly of the lamp-housing assembly by a user is enabled in a toolless and/or single-handed way. Advantageously, the lamp-housing assembly may be configured for being assembled or disassembled without using tools, and preferably only one hand of the user may be sufficient for the operation. A user may therefore concentrate on the delicate assembly or disassembly process, carrying out one task at a time, and thereby reducing the risk of damage or even injury.

In an embodiment, the lamp-housing assembly comprises a thermal expansion compensating element configured for at least partially compensating thermal expansion-caused misalignment between the lamp, the lamp cap, and the lamp seat. Due to the excessive amount of heat created for example by a gas discharge lamp during operation, and in view of the limited heat removal performance of the lamp-housing assembly, temperature differences or gradients may be established during operation of the lamp-housing assembly. As a result, thermal expansion in different regions of the lamp-housing assembly may be different, which may lead to thermal load. Such a thermal load may be reduced by providing a thermal expansion compensating element (for instance realized as one or a plurality of springs) which carries out a balancing motion for at least partially equilibrating spatially dependent variations of thermal expansion.

In an embodiment, the accommodation volume of the lamp is divided into three convection-inhibited separated staggered chambers. In terms of preventing overheating of a bottom side of the lamp-housing assembly, three convection-inhibited separated staggered chambers have turned out to be particularly efficiently. Two convection barriers are then operative for preventing overheating of a bottom portion of the lamp seat by preventing or at least inhibiting heat from the light emitting lamp from propagating downwardly by heat convection.

In an embodiment, adjacent ones of the at least two convection-inhibited separated staggered chambers are separated by a respective thermally conductive separation ring having a central hole for accommodating a respective portion of the lamp. Thus, the lamp can be guided through the central holes of the one or more separation rings separating mutual pairs of two or more chambers during an assembly or disassembly process. When assembled, the lamp extends through the central hole(s) so that only a minor gap remains between a (respective) separation ring and the lamp. Heat convection through such one or more minor gaps may be very small or may even be neglected. Hence, the requirements of heat regulation and needs of a simple assembly may be synergistically combined.

In an embodiment, the accommodation volumes of lamp seat-sided portion and lamp cap-sided portion of the lamp are separated from each other by configuring an interface in between substantially gap-free and/or mutually sealed by at least one sealing. Preferably, the accommodation volume of the lamp seat-sided portion may be even hermetically shielded with respect to the accommodation volume of the lamp cap-sided portion when the lamp is mounted in the lamp seat (wherein the hermetic shielding may be of such a kind that fluid tightness of the hermetically shielded region may be ensured up to at least 100 mbar overpressure, in particular up to at least 300 mbar overpressure). By avoiding gaps and/or by providing one or more sealings in gaps between the accommodation volumes related to the lamp cap-sided portion and the lamp seat-sided portion of the lamp, at least the mechanism of heat convection in an upward direction may be strongly suppressed or even eliminated.

In an embodiment, the at least two convection-inhibited separated staggered chambers are staggered along a staggering direction corresponding to an axis between opposing ends (preferably with electric terminals) of the lamp. Hence, a main heat flow direction may correspond to a staggering direction, so that the thermal decoupling effect of the staggering is particularly pronounced.

Embodiments may be implemented in conventionally available HPLC systems, such as the analytical Agilent 1290 Infinity II LC system or the Agilent 1290 Infinity II Preparative LC/MSD system (both provided by the applicant Agilent Technologies—see www.agilent.com.

One embodiment of a fluid drive comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The sample separation unit of the sample separation apparatus preferably comprises a chromatographic column (see for instance en.wikipedia.org/wiki/Column_chromatography) providing a stationary phase. The column may be a glass or steel tube (for instance with a diameter from 50 µm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated efficiently. The mobile phase may comprise an organic solvent like for instance methanol or acetonitrile, often diluted with water. For gradient operation water and organic is delivered in separate bottles, from which the gradient pump delivers a programmed blend to the system. Other commonly used solvents may be isopropanol, THF, hexane, ethanol and/or any combination thereof or any combination of these with afore-mentioned solvents.

A fluidic sample analyzed by a sample separation apparatus according to an exemplary embodiment of the present disclosure may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. For example, a fluorescence detector may be implemented.

Embodiments of the present disclosure can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

BRIEF DESCRIPTION OF DRAWINGS

Other objects and many of the attendant advantages of embodiments of the present disclosure will be readily appreciated and become better understood by reference to the following more detailed description of embodiments in connection with the accompanying drawings. Features that are substantially or functionally equal or similar will be referred to by the same reference signs.

Figure 1:
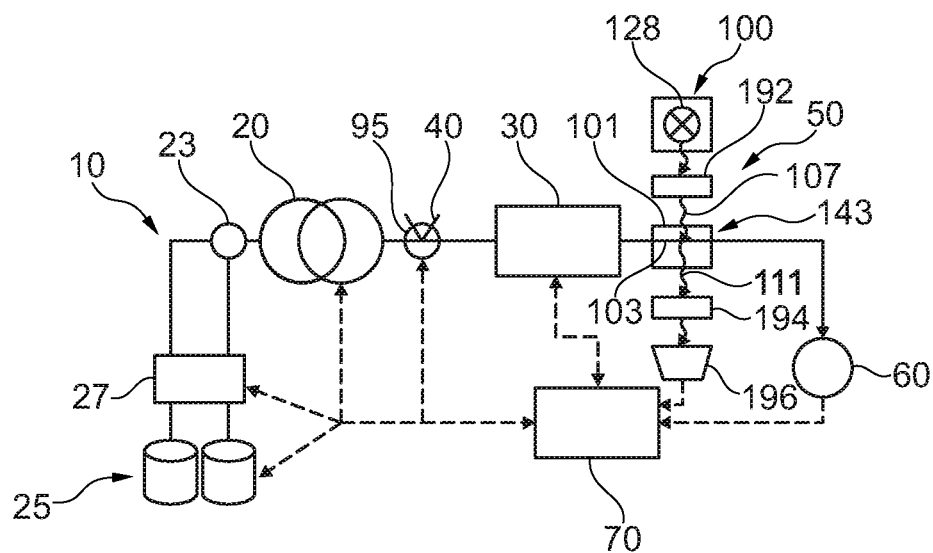
FIG. 1 shows a liquid sample separation apparatus in accordance with embodiments of the present disclosure, particularly used in high performance liquid chromatography (HPLC).

The illustrations in the drawings are schematic.

DETAILED DESCRIPTION

Before describing the figures in further detail, some basic considerations of the present disclosure will be summarized based on which exemplary embodiments have been developed.

According to an exemplary embodiment of a first aspect of the present disclosure, a lamp-housing assembly for a fluorescence detector of a liquid chromatography sample separation apparatus comprises a lamp seat, gas discharge lamp in the lamp seat, and a lamp cap covering the lamp seat and the lamp, wherein the mentioned elements may be assembled with self-alignment both in axial and radial direction. After self-alignment, any additional manual post-alignment may be dispensable. The described self-alignment is particularly advantageous for use of the lamp-housing assembly in a fluorescence detector of an HPLC, since the lamp is automatically optically aligned with respect to the other detector components. Advantageously, mounting the lamp-housing assembly will not only establish a self-aligned mechanical arrangement with light emission at a predefined position and in a predefined direction, but will simultaneously establish an electric connection between electric lamp terminals and electric terminals of lamp seat and lamp cap. Preferably, also one or more heat removal paths within the lamp-housing assembly may be established by the mere mechanical assembly of lamp seat, lamp and lamp cap. Operation of the lamp-housing assembly is therefore possible without tools and in a highly intuitive way, and faulty assembly may be excluded. This may be of utmost advantage when using dangerous gas discharge lamps, which are highly advantageous for fluorescence detectors of HPLCs. For assembly, it may be sufficient that the lamp is put in a loose way in an accommodation volume of the lamp seat, and a lamp cap is mounted on top. By closing a fastening mechanism (preferably a bayonet mechanism) between lamp seat and lamp cap with the lamp in between, self-alignment of the lamp may be triggered. No further action of the user may be necessary.

According to an exemplary embodiment of a second aspect of the present disclosure, a lamp suitable for an HPLC fluorescence detector is provided with a lamp body which may be configured for emitting light by gas discharge, and which may have electric terminals at axially opposing ends. Advantageously, a thermally conductive and electrically insulating flange member, preferably formed as an integral ceramic body, may suppress creepage current between the opposing electric terminals and may thereby improve the electric reliability. Furthermore, the flange body may significantly contribute to heat removal and heat spreading to thereby improve the thermal reliability of the lamp-housing assembly. During operation, at least a significant portion of heat removal may be accomplished by the ceramic flange member. Heat conducted by the flange member away from the lamp body may be dissipated towards the lamp cap and may then be removed by a cooling fluid stream.

According to an exemplary embodiment of a third aspect of the present disclosure, a lamp-housing assembly appropriate for an HPLC fluorescence detector comprises a lamp seat, a gas discharge lamp in the lamp seat, and a lamp cap covering lamp seat and lamp. Advantageously, a lamp seat-sided portion of the lamp in the lamp seat is thermally shielded relative to the lamp portion on the side of the lamp cap by arranging lamp seat-sided portion and lamp cap-sided portion in separate accommodation volumes. This shielding may suppress in particular heat convection between the accommodation volumes. Furthermore, the accommodation volume accommodating the lamp seat-sided portion may be further separated into two or more (for example three) staggered chambers which are configured for suppressing or even completely disabling heat convection between different chambers. This prevents advantageously accumulation of heat, created by the lamp, deep inside the lamp seat where only a limited heat removal may be achievable. In particular, this may prevent a bottom electric terminal of the lamp from overheating. By separating or decoupling two, three or even more chambers in terms of heat convection in between, heat accumulation or the formation of hotspots may be prevented in particular deep inside the lamp seat.

According to an exemplary embodiment, a tool-free lamp mounting may be enabled for a correspondingly designed lamp-housing assembly. Such a lamp design may be particularly advantageous for gas discharge lamps like for example Hg—Xe- and Xe-lamps. More specifically, a design for a lamp housing and for a high voltage direct current (DC) light source is provided enabling a tool-free and adjustment-free mounting. In particular, such a tool-free mounting may be combined with a simultaneous establishment of an electrical connection, preferably via a bayonet lock. Advantageously, a risk of damage during installation may be strongly reduced, in particular when providing a force-controlled lamp seat. In an advantageous embodiment, cooling and electrical insulation of a high voltage side of the lamp (in particular at its anode) may be promoted by a ceramic flange member. Further advantageously, no lamp adjustment may be necessary, as the ceramic flange member may be adjusted and connected to the lamp (in particular in relation to its lamp spot) at a factory side.

A further advantage of exemplary embodiments of the present disclosure is an easy assembly (since no tools are necessary for assembly) for a user, as well as additional functions integrated in the lamp-housing assembly. Examples for integrated functions are that, during the tool-free assembly of the lamp-housing assembly, its members align themselves. At the same time, an electrical contact to the lamp may be established.

Since high voltage DC lamps may have a very high temperature gradient and may expand during operation, contact springs may be arranged at both ends in such a way that they can compensate the thermal linear expansion and prevent damage of the lamp.

In an exemplary embodiment, a spring integrated in a bayonet lock may also limit the assembly force. This may prevent damage during the assembly of the lamp, for example caused by overtightening. A spring force may hold the lamp in position, and may provide a contact pressure against the lamp housing, to thereby achieve a good heat transfer and thus a good cooling.

A ceramic flange member mounted and adjusted on the lamp may serve on the one hand for an electrical insulation of a high voltage. On the other hand, the flange member may serve as a heat sink with its good thermal conductivity and may prevent overheating of electrical contacts. The ceramic flange member may be adjusted to the lamp spot, so that an adjustment after a lamp change is not necessary.

Preferably, a bayonet lock may be provided for simplifying fastening of the members of the lamp-housing assembly. Preferably, cooling openings may be formed in the lamp-housing assembly (in particular in a lamp cap) facing a cooling air flow so that in particular a hot anode of the lamp can be additionally cooled with air. Advantageously, the design of the lamp-housing assembly may render it impossible that a user unintentionally touches electrically conductive parts during operation.

Referring now in greater detail to the drawings, FIG. 1 depicts a general schematic of a liquid separation system as example for a sample separation apparatus 10 according to an exemplary embodiment of the present disclosure. A fluid drive 20 (such as a piston pump) receives a mobile phase from a solvent supply 25 via degassing unit 27, which degases and thus reduces the amount of dissolved gases in the mobile phase. The fluid drive 20 drives the mobile phase through a separation unit 30 (such as a chromatographic column) comprising a stationary phase. A sampler or injector 40, implementing a fluidic valve 95, can be provided between the fluid drive 20 and the separation unit 30 in order to subject or add (often referred to as sample introduction) a sample fluid into the mobile phase so that a fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid in sample containers.

While the mobile phase can be comprised of one solvent only, it may also be mixed from plural solvents. Such mixing carried out by a mixer 23 may be a low pressure mixing and provided upstream of the fluid drive 20, so that the fluid drive 20 already receives and pumps the mixed solvents as the mobile phase. Alternatively, the fluid drive 20 may comprise plural individual pumping units, with plural of the pumping units each receiving and pumping a different solvent or mixture, so that the mixing of the mobile phase (as received by the sample separation unit 30) occurs at high pressure and downstream of the fluid drive 20 (or as part thereof). The composition of the mobile phase may be kept constant over time, the so-called isocratic mode, or varied over time, the so-called gradient mode. At the position of mixer 23, it is also possible to arrange a proportioning unit (not shown).

A data processing unit or control unit 70, which can be a PC or workstation, may be coupled (as indicated by the dashed arrows) to one or more of the devices in the sample separation apparatus 10 in order to receive information and/or control operation. For example, the control unit 70 may control operation of the fluid drive 20 (for example setting control parameters) and receive therefrom information regarding the actual working conditions (such as output pressure, etc. at an outlet of the pump). Optionally, the control unit 70 may also control operation of the solvent supply 25 (for example setting the solvent/s or solvent mixture to be supplied) and/or the degassing unit 27 (for example setting control parameters and/or transmitting control commands) and may receive therefrom information regarding the actual working conditions (such as solvent composition supplied over time, vacuum level, etc.). The control unit 70 may further control operation of the sampling unit or injector 40 (for example controlling sample injection or synchronization sample injection with operating conditions of the fluid drive 20). The separation unit 30 may also be controlled by the control unit 70 (for example selecting a specific flow path or column, setting operation temperature, etc.), and send—in return—information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) and provides data back.

Now referring in detail to detector 50, an electromagnetic radiation source in the form of a lamp 128 in a lamp-housing assembly 100 emits light as primary electromagnetic radiation, for instance a polychromatic beam with a broad range of wavelengths (for instance from 200 nm to 1100 nm). For example, lamp 128 may be a xenon arc lamp. This broad range of primary electromagnetic radiation wavelengths may allow a user to select a narrow wavelength range from said broad wavelength range in accordance with a desired application. This wavelength selection may be made by an inlet or excitation monochromator 192, such as a Bragg grating. The inlet monochromator 192 may select a narrow bandwidth of for instance 15 nm to 20 nm for use as excitation electromagnetic radiation beam 107 in the shown fluorescence detector 50. This wavelength-selected excitation electromagnetic radiation beam 107 may then propagate through an electromagnetic radiation inlet into a cuvette 101 of a flow cell 143. The fluidic sample, which has been separated by the sample separation unit 30, flows through a flow channel 103 extending along the cuvette 101. During flowing through the flow channel 103, the separated fluidic sample interacts with the excitation electromagnetic radiation beam 107, and can thereby be optically excited. For instance, certain amino acids, aromatic molecules, or fluorescence labels of a respective fraction of the separated fluidic sample may be excited by absorption of the excitation electromagnetic radiation. After excitation, the fluidic sample may emit fluorescence radiation, which may propagate as emission electromagnetic radiation beam 111 to an electromagnetic radiation outlet. Although not shown in the schematic view of FIG. 1, the flow cell 143 may be preferably configured so that a main propagation direction of the excitation electromagnetic radiation beam 107 is substantially perpendicular to a main propagation direction of the detected emission electromagnetic radiation beam 111. The emission electromagnetic radiation, being characteristic for a corresponding fraction of the fluidic sample, may then propagate to an outlet or emission monochromator 194, such as a Bragg grating. Descriptively speaking, the emission monochromator 194 may select a detection wavelength or a narrower detection wavelength range. In particular, emission monochromator 194 may filter out parasitic radiation, such as an optical underground (or background) as well as parasitic radiation created for instance by Raman and Rayleigh scattering. Emission electromagnetic radiation passing said emission monochromator 194 may then be detected by a detecting unit 196, such as a photodiode, a linear array of photocells, or a two-dimensional camera (such as a CMOS camera or a CCD camera). The detection data may be transmitted to control unit 70 for further processing.

Figure 2:
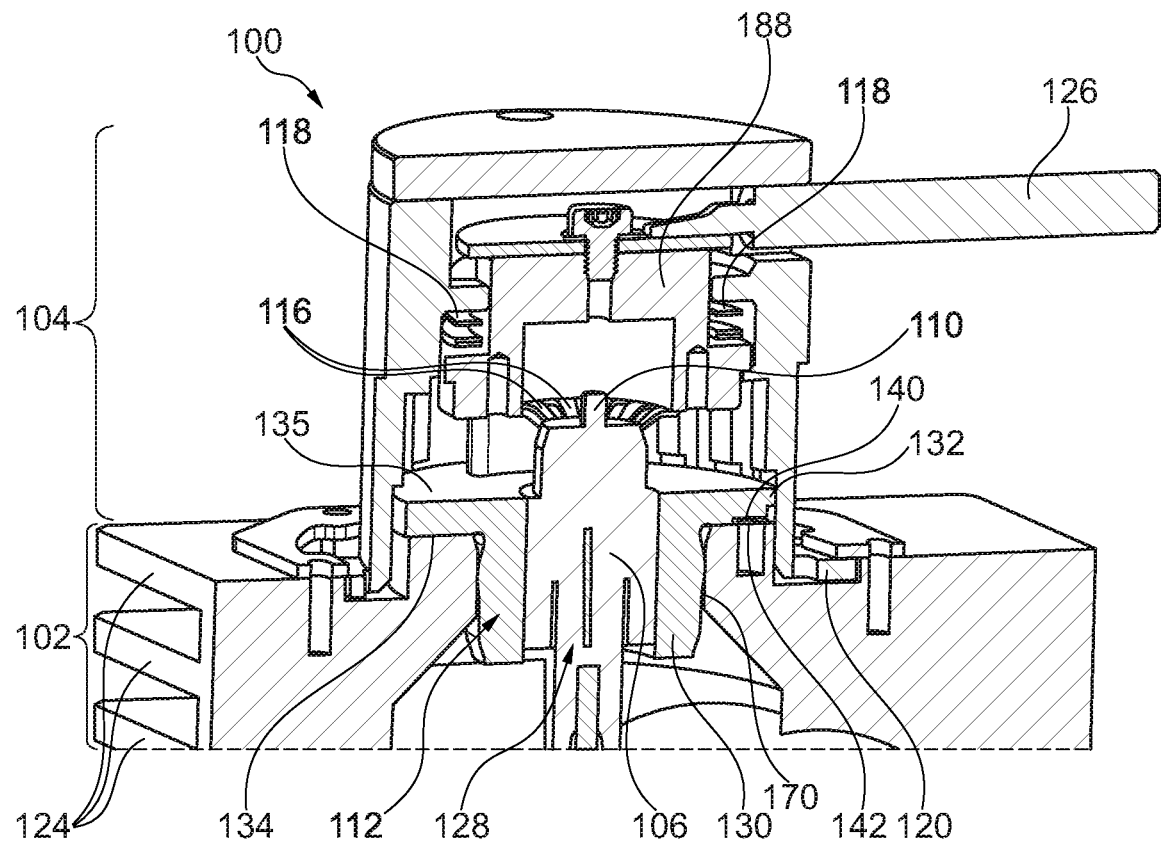
FIG. 2 shows a three-dimensional cross-sectional view of an upper portion of a lamp-housing assembly according to an exemplary embodiment of the present disclosure implementable in the sample separation apparatus of FIG. 1.
Figure 3:
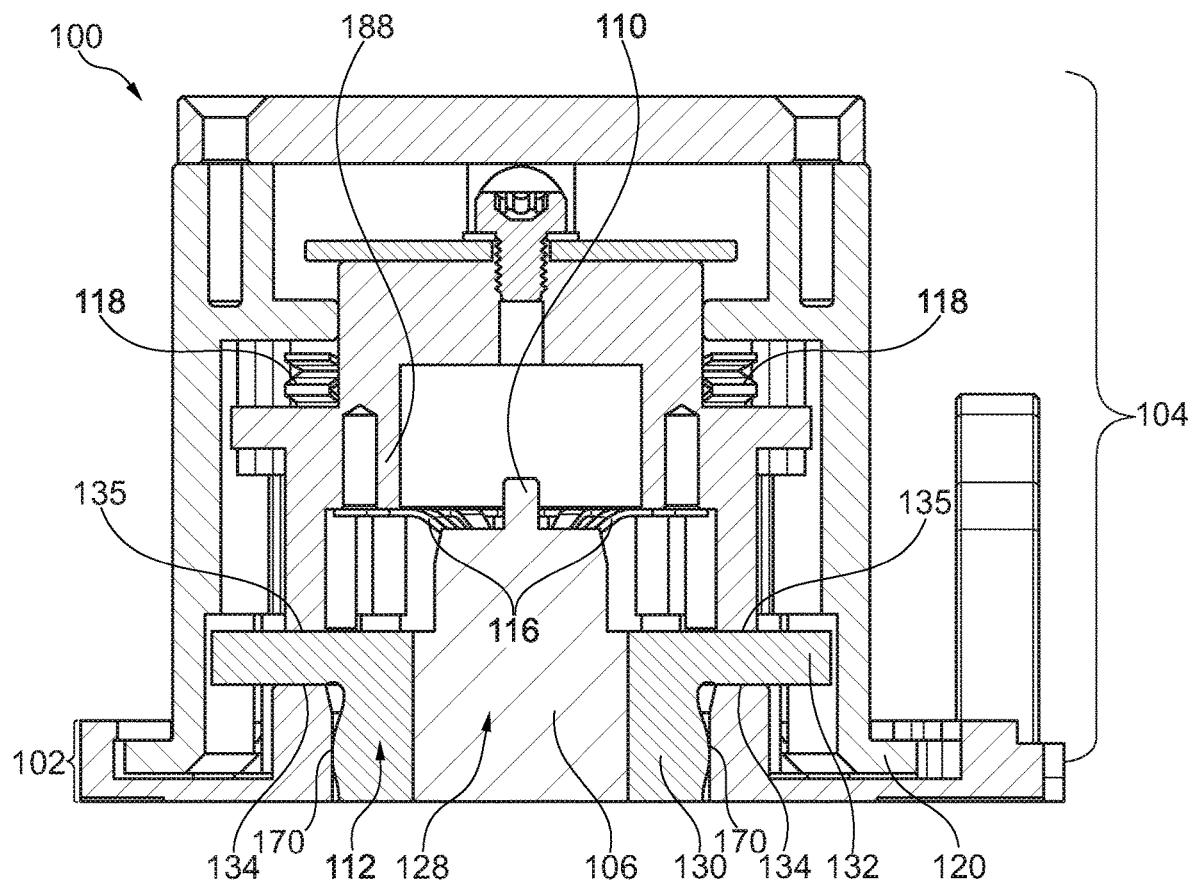
FIG. 3 shows a cross-sectional view of an upper portion of the lamp-housing assembly according to FIG. 2.
Figure 4:
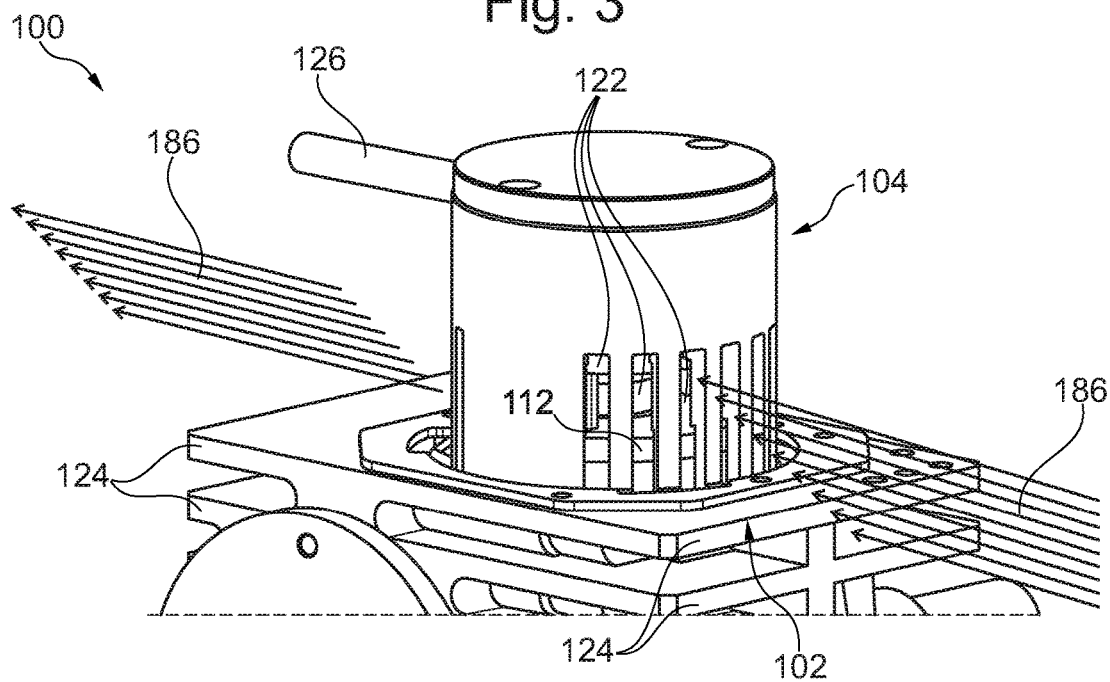
FIG. 4 shows a three-dimensional view of an upper portion of the lamp-housing assembly according to FIG. 2.
Figure 5:
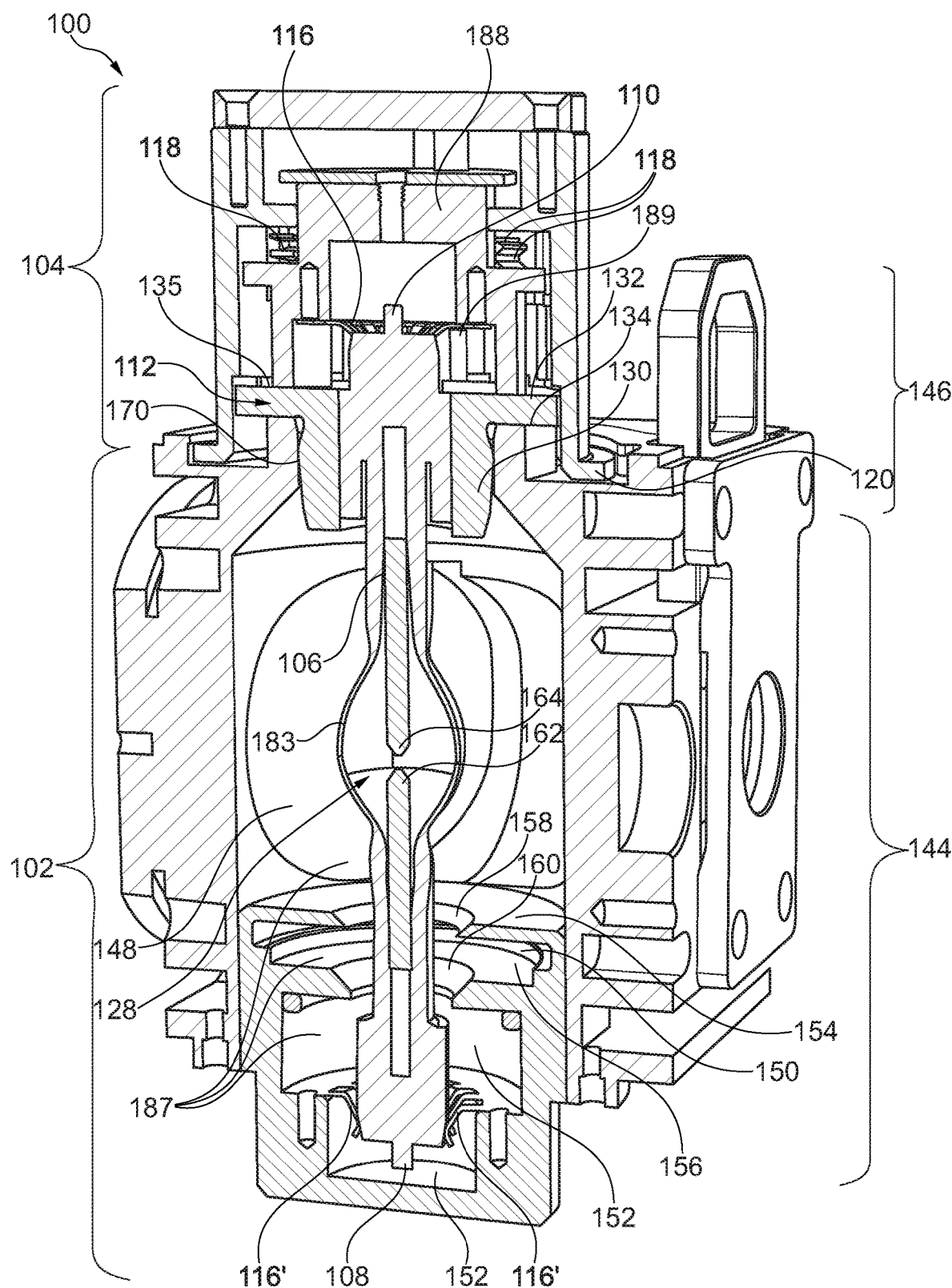
FIG. 5 shows a three-dimensional cross-sectional view of the lamp-housing assembly according to FIG. 2.
Figure 6:
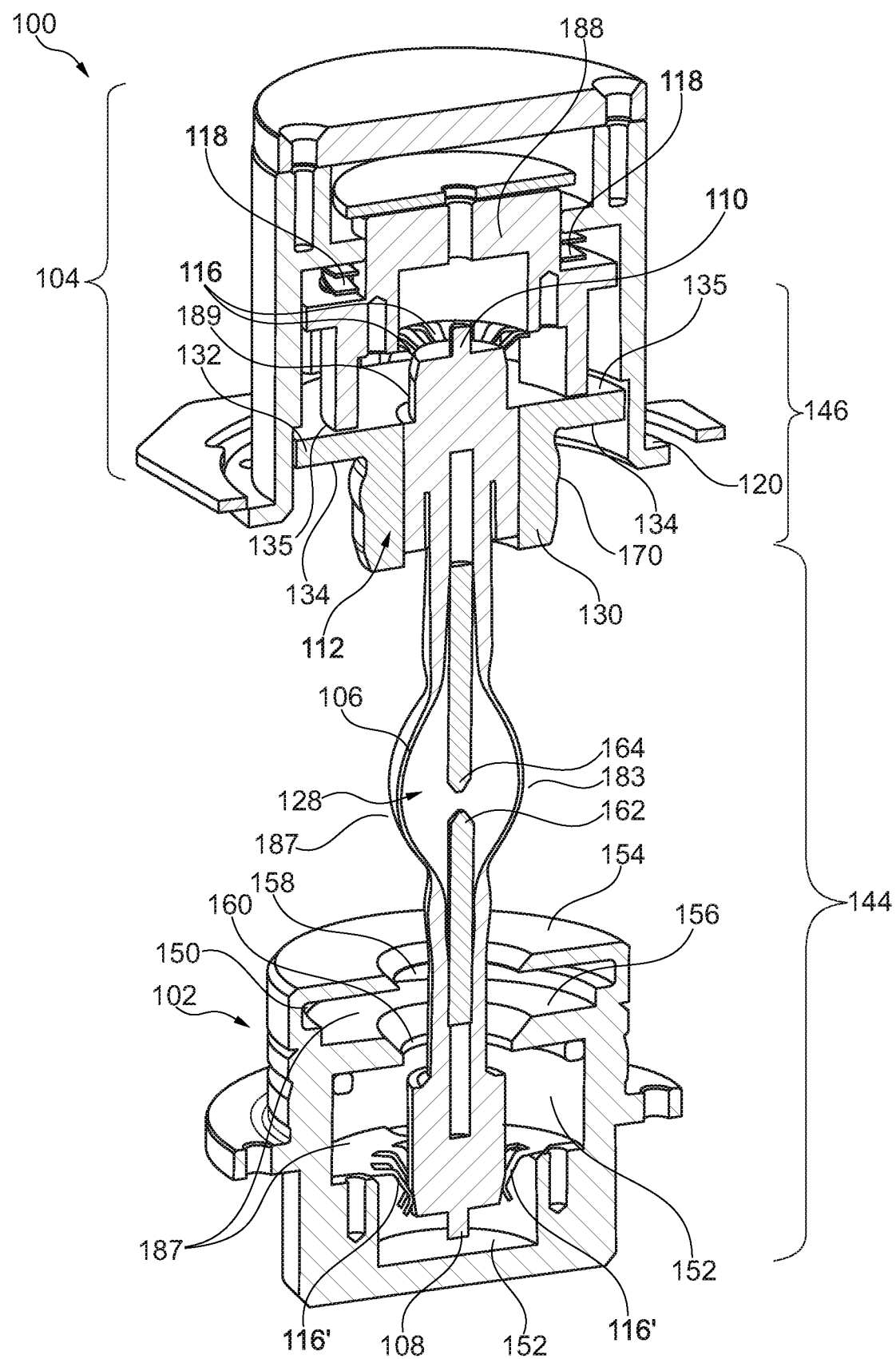
FIG. 6 shows a three-dimensional cross-sectional view of a portion of the lamp-housing assembly according to FIG. 2.
Figure 7:
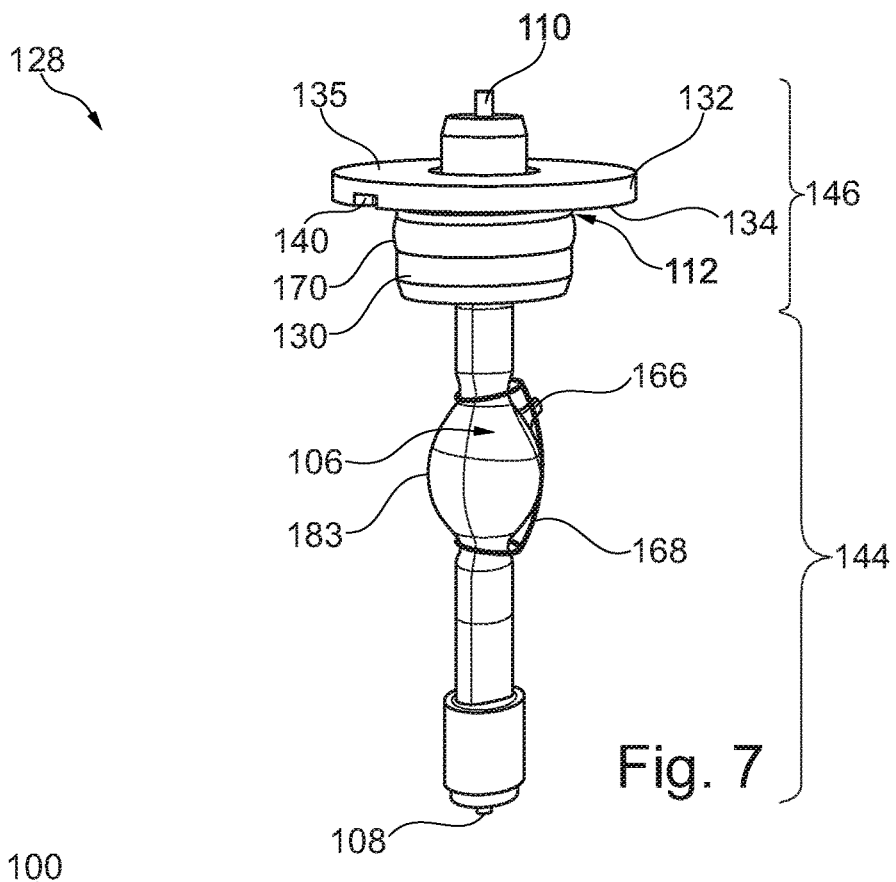
FIG. 7 shows a three-dimensional view of a lamp of the lamp-housing assembly according to FIG. 2.

In the following, exemplary embodiments of the lamp-housing assembly 100 and the lamp 128 implemented in FIG. 1 will be explained referring to the following figures:

FIG. 2 shows a three-dimensional cross-sectional view of an upper portion of a lamp-housing assembly 100 according to an exemplary embodiment of the present disclosure implementable in the sample separation apparatus 10 of FIG. 1. FIG. 3 shows a cross-sectional view of an upper portion of the lamp-housing assembly 100 according to FIG. 2. FIG. 4 shows a three-dimensional view of an upper portion of the lamp-housing assembly 100 according to FIG. 2. FIG. 5 shows a three-dimensional cross-sectional view of the lamp-housing assembly 100 according to FIG. 2. FIG. 6 shows a three-dimensional cross-sectional view of a portion of the lamp-housing assembly 100 according to FIG. 2. FIG. 7 shows a three-dimensional view of a lamp 128 of the lamp-housing assembly 100 according to FIG. 2. Although FIG. 2 to FIG. 7 illustrate the lamp-housing assembly 100 and its constituents in a vertical configuration, lamp 128 may be assembled in a horizontal fashion in the lamp-housing assembly 100 (for instance 90° rotated as compared to the illustration of FIG. 2 to FIG. 7, not shown).

The gas discharge-type lamp 128 usable advantageously for detector 50 of sample separation apparatus 10 can be best seen in FIG. 5 to FIG. 7 and comprises a lamp body 106. Inside lamp body 106, two spaced electrodes 162, 164 are supplied with electric current to form a plasma in between which leads to the emission of light in the space between the electrodes 162, 164. The electric current may be applied between a first electric terminal 108 and a second electric terminal 110 at axially opposing ends of the lamp body 106. For supplying electric current to the lamp 128, a lamp seat 102 of the lamp-housing assembly 100 comprises a bottom-sided set of annular electrically conductive contact springs 116' configured for establishing an electric connection with the first electric terminal 108 when inserting the lamp 128 into the lamp seat 102. Correspondingly, a lamp cap 104 (which may be made of plastic material, for reliably ensuring electric isolation) of lamp-housing assembly 100 comprises a top-sided set of annular electrically conductive contact springs 116 configured for establishing an electric connection with the second electric terminal 110 when mounting the lamp cap 104 on the lamp seat 102 and on the inserted lamp 128. Thus, the annular contact springs 116', 116 contribute both to the establishment of a mechanical connection and an electric connection between lamp 128 on the one hand and lamp seat 102 as well as lamp cap 104 on the other hand. Hence, the lamp seat 102, the lamp 128 and the lamp cap 104 are configured so that inserting the lamp 128 into the lamp seat 102 and mounting the lamp cap 104 on the lamp 128 and on the lamp seat 102 automatically establishes an electric coupling of the first electric terminal 108 and the second electric terminal 110 with counter electrodes in form of annular contact springs 116, 116' of the lamp seat 102 and of the lamp cap 104. Inside the lamp cap 104, a metallic member 188 (see FIG. 2) is arranged for promoting heat removal by heat conduction.

For example, lamp 128 may be a Hg—Xe-lamp with a spectral emission range from 185 nm to 2000 nm. A bulb material of lamp 128 may be fused silica. An electric power of lamp 150 may be 150 W. Lamp current may be about 7.5 A, whereas lamp voltage may be 20 V. A trigger voltage of the lamp 128 may be 15 kV.

When electric current is applied and lamp 128 emits light, a portion of said light propagates towards a flow cell (see reference sign 143, shown only in FIG. 1), in particular in a horizontal direction according to FIG. 5.

FIG. 7 also illustrates a filler plug 166 of lamp body 106 for filling gas (such as xenon) into the lamp body 106. Moreover, FIG. 7 shows an electric field adjusting wire 168 for adjusting an electric field at the lamp body 106. As will be described in the following, lamp 128 will experience self-alignment both in a radial as well as in an axial direction when mounted in lamp seat 102 and when being covered by lamp cap 104. This self-alignment also ensures advantageously that electric field adjusting wire 168 will not be located in a light propagation path from lamp body 106 to the flow cell 143. This is advantageous, since it prevents weakening of the excitation light used in detector 50.

As already mentioned, the lamp-housing assembly 100 comprises the bottom-sided lamp seat 102, the above-described lamp 128 inserted into the lamp seat 102, and the aforementioned lid-type lamp cap 104 mounted to cover the lamp seat 102 and the inserted lamp 128. In view of their illustrated geometrical and electric configuration, the lamp seat 102, the lamp 128 and the lamp cap 104 are matched with respect to each other so that, merely by inserting the lamp 128 into the lamp seat 102 and by mounting the lamp cap 104 on the lamp seat 102 and on the inserted lamp 128, the lamp 128 will be axially and radially aligned and electrically coupled with the lamp seat 102 and the lamp cap 104. No further action of the user is necessary to achieve this self-alignment. The bottom-sided set of annular contact springs 116' centers the first terminal 108 (in particular a cathode) of the lamp 128 when the first terminal 108 of the lamp 128 is inserted in a center of the array of annular contact springs 116'. At the same time, the above-described electric connection between the annular contact springs 116' and the first terminal 108 is established. Correspondingly, the top-sided set of annular contact springs 116 vertically fixes the second terminal 110 (in particular an anode) of the lamp 128 when the second terminal 110 of the lamp 128 is accommodated in a center of the array of annular contact springs 116. At the same time, the above-described electric connection between the annular contact springs 116 and the second terminal 110 is established. Thus, all a user has to do for mounting a lamp 128 in lamp-housing assembly 100 in an aligned fashion is to insert lamp 128 in lamp seat 102 and to attach and turn lamp cap 104 to close a bayonet mechanism 120 between lamp seat 102 and lamp cap 104. By fastening the lamp-housing assembly 100 using the bayonet mechanism 120, both an axial and a radial fixation can be completed, as well as a fixing of the electric contacts inside of lamp-housing assembly 100. Correspondingly, all a user has to do for changing a (for instance damaged) lamp 128 in lamp-housing assembly 100 is to open the bayonet mechanism 120 by operating operation lever 126, remove the old lamp 128 from lamp seat 102, insert a new lamp 128 in lamp seat 102 and attach and turn lamp cap 104 to close bayonet mechanism 120 between lamp seat 102 and lamp cap 104 to fix the lamp 128 in place and to align it radially and axially.

FIG. 2 illustrates that the lamp cap 104 comprises the manually actuatable operation lever 126 which can be operated by a user for assembling or disassembling the lamp cap 104 with respect to the lamp seat 102. Thus, assembly or disassembly of the lamp-housing assembly 100 may be carried out by a single hand of a user and without tools.

Furthermore, the lamp-housing assembly 100 comprises a thermally conductive and electrically insulating flange member 112 which may be integrally formed of a ceramic such as aluminum nitride. Flange member 112 may be substantially T-shaped with a central vertical through hole. As best seen in FIG. 7, the flange member 112 may be arranged and fixedly connected on the lamp body 106 for enhancing an electric isolation of the first electric terminal 108 with respect to the second electric terminal 110. Descriptively speaking, the material and geometry of the flange member 112 significantly increases a potential path length along which a creepage current would have to flow between the opposing electric terminals 108, 110 for unintentionally causing a short-circuit fault of lamp 128. By functioning as a creepage current inhibitor, the flange member 112 may improve the electric reliability of the lamp-housing assembly 100. Furthermore, the ceramic material of the flange member 112 is configured, thanks to its very high thermal conductivity, for efficiently removing heat from the lamp body 106 during operation. Thus, the flange member 112 also fulfils a heat dissipating function.

More specifically, the flange member 112 comprises a tubular sleeve section 130 surrounding part of the lamp body 106 with close contact, and comprises a plate-shaped or disc-shaped section 132 which is integrally formed with the sleeve section 130 and has a larger lateral and smaller axial extension than the sleeve section 130. Descriptively speaking, the sleeve section 130 has a high contact area with the lamp body 106 and therefore ensures a strong thermal coupling between lamp body 106 and flange member 112. The laterally elongate and substantially rotationally symmetric disc-shaped section 132 provides a highly thermally conductive and well-defined thermal path away from the lamp body 106 and therefore functions for heat removal. The integral formation of the disc-shaped section 132 and the sleeve section 130 ensures a proper thermal conduction inside of the flange member 112 without disturbing material bridges in between. Furthermore, the disc-shaped section 132 provides at its bottom side a planar mounting surface 134 to rest on the lamp seat 102 and provides at its top side a further planar mounting surface 135 on which the lamp cap 104 can rest. The mounting surface 134 rests on the lamp seat 102 so that the bottom surface of the disc-shaped section 132 defines a vertical position of the lamp 128 and advantageously prevents tilting of the lamp 128. From a top side of the disc-shaped section 132, heat can be conducted upwardly and may be removed by a gas stream flowing through cooling openings 122 in lamp cap 104 and from there towards an environment of the lamp-housing assembly 100, as shown in FIG. 4 and as described below.

A further advantageous feature of the flange member 112 is circumferential convex section 170 at an exterior lateral area of sleeve section 130. Said convex section 170 aligns the lamp 128 in a horizontal plane. Hence, convex section 170 contributes to the self-alignment of lamp-housing assembly 100. Convex section 170 can be located axially directly next to disc-shaped section 132. The design of convex section 170 also prevents that the mechanical system of lamp-housing assembly 100 is over-determined. Also, convex section 170 may prevent lamp 128 from tilting during and after assembly.

Again referring to FIG. 5, the flange member 112 rests on the lamp seat 102 at a vertical position above the first electric terminal 108 and below the second electric terminal 110. By this geometric arrangement, the creepage distance between the electric terminals 108, 110 can be extended significantly in particular thanks to the disc-shaped section 132 which significantly prolongs a potential creepage current propagation path.

Beyond this, the flange member 112 and the lamp cap 104 are configured so that, by inserting the lamp 128 into the lamp seat 102 and by mounting the lamp cap 104 on the lamp seat 102 and on the inserted lamp 128, a continuous thermally conductive path is established between the flange member 112 and the lamp cap 104. Thus, a significant portion of heat generated by the lamp 128 during operation can be removed by the flange member 112 upwardly towards the lamp cap 104. This promotes cooling of the lamp 128.

Again referring to the above-described self-alignment of the lamp-housing assembly 100 upon mounting of the same, the flange member 112 has on its bottom-sided mounting surface 134 a notch as an engagement structure 140, see FIG. 2 and FIG. 7. Correspondingly, the lamp seat 102 may have a matching further engagement structure 142 in form of an inverse shaped protrusion, so that a mutual engagement between the engagement structure 140 and the further engagement structure 142 upon inserting the lamp 128 into the lamp seat 102 fixes the lamp 128 at the lamp seat 102 in a target angular position, i.e ensures radial alignment. Thus, the notch functions as a further alignment feature. The required form closure between engagement structures 140, 142 for completing assembly of lamp-housing assembly 100 guarantees as well that the electric field adjusting wire 168 is outside of the light propagation path from lamp 126 to flow cell 143, since an erroneous orientation of the lamp 128 in the lamp seat 102 is rendered mechanically impossible. Also the lamp seat 102 and the lamp 128 are formed with matching shape so that inserting the lamp 128 in the lamp seat 102 leads to a self-alignment between the lamp seat 102 and the lamp 128.

As best seen in FIG. 3, the lamp-housing assembly 100 comprises a force-controlling biasing element 118 embodied as biasing spring and being configured for biasing the flange member 112 by applying an axial preload to the flange member 112. Biasing element 118 prevents damage upon assembly or disassembly of lamp-housing assembly 100 and is compressed upon closing lamp-housing assembly 100 by bayonet mechanism 120. Thus, the biasing element 118 protects the lamp-housing assembly 100 against damage by an excessive connection force. The biasing element 118 may be embodied as leaf spring or helical spring and may have an annular shape (not shown). Moreover, said biasing element 118 may also function as a thermal expansion compensating element for at least partially compensating thermal expansion-caused misalignment between the lamp 128, the lamp cap 104, and the lamp seat 102. When misalignment between the mentioned constituents of the lamp-housing assembly 100 due to different CTE values of the corresponding materials occurs, the biasing element 118 may slightly expand or contract for balancing out thermally induced load.

Now referring to FIG. 4, the lamp cap 104 has cooling openings 122 for enabling a flow of cooling fluid, in the shown configuration surrounding air, through the lamp-housing assembly 100. More specifically, the flange member 112 and the metallic member 188 in lamp cap 104 are thermally coupled in such a way that thermal energy created by the lamp 128 is dissipated along a continuous thermally conductive path from lamp 128 via flange member 112 and metallic member 188 in lamp cap 104 and from there through the cooling openings 122. A cooling gas flow is indicated with reference sign 186 in FIG. 4. This removes a significant portion of heat created by lamp 128 during operation upwardly and then away from the lamp-housing assembly 100.

As best seen in FIG. 2, the lamp-housing assembly 100 comprises a cooling body 124 which may be integrally formed with the lamp seat 102 for removing heat. In the shown embodiment, the cooling body 124 has a plurality of cooling fins which have a large thermal exchange surface with an environment and thereby ensure efficient cooling.

In the following, a further advantageous aspect in terms of thermal management of the lamp-housing assembly 100 will be explained referring to FIG. 5 and FIG. 6:

As best seen in FIG. 5, a lamp seat-sided portion 144 of the lamp 128 (including a light-emitting portion 183 of the lamp 128) and a lamp cap-sided portion 146 of the lamp 128 are arranged in different separated accommodation volumes 187, 189 which are defined or delimited by the lamp seat 102 and by the lamp cap 104, respectively. Thus, the lamp seat-sided portion 144 and the lamp cap-sided portion 146 are arranged in separated accommodation volumes 187, 189, which promotes a thermal decoupling or shielding between the lamp seat-sided portion 144 and the lamp cap-sided portion 146. More specifically, the accommodation volumes 187, 189 are separated from each other (in particular for disabling fluid communication in between) by configuring an interface in between substantially gap-free (and/or mutually sealed by one or more sealings, not shown) in an assembled state of the lamp 128. In a preferred embodiment, the accommodation volumes 187, 189 accommodating the lamp seat-sided portion 144 and the lamp cap-sided portion 146, respectively are hermetically shielded with respect to each other. As a result, no gas or substantially no gas can flow between lamp seat-sided portion 144 and cap-sided portion 146. The main heat transfer mechanism between portions 144 and 146 is therefore heat conduction. Descriptively speaking, a significant portion of heat generated by lamp 128 will be transferred upwardly according to FIG. 5 and may be dissipated through an environment at least partially by cooling openings 122.

Moreover, the lamp seat-sided portion 144 is arranged in its accommodation volume 187 which is divided, in turn, into three only very weakly coupled convection-inhibited separated staggered chambers 148, 150, 152. In other embodiments, only two or at least four convection-inhibited separated staggered chambers are possible. Referring to a bottom side of the lamp-housing assembly 100 shown in FIG. 5 and FIG. 6, an interior volume of the lamp seat-sided portion 144 of the lamp-housing assembly 100 is divided into the three convection-inhibited separated staggered chambers 148, 150, 152. The uppermost chamber 148 directly surrounds the light emitting region 183 of the lamp 128. The lowermost chamber 152 surrounds first electric terminal 108. The intermediate chamber 150 is arranged between the lowermost chamber 152 and the uppermost chamber 148. As shown, adjacent ones of the three convection-inhibited separated staggered chambers 148, 150, 152 are separated by a respective thermally conductive separation ring 154, 156 (for instance made of aluminum or a ceramic) having a central hole 158, 160 for accommodating a respective portion of the lamp 128. The material of separation rings 154, 156 shall be selected so that no outgassing of contaminants occurs. The three convection-inhibited separated staggered chambers 148, 150, 152 are staggered along a vertical staggering direction corresponding to an axis between opposing electric terminals 108, 110 of the lamp 128. As best seen in FIG. 5, the lamp 128 is guided through the central holes 158, 160 in the centers of separation rings 154, 156 with an only very small gap in between. Consequently, heat convection for transferring heat between the separated staggered chambers 148, 150, 152 may be strongly suppressed. By strongly suppressing fluid flow between chambers 148, 150, 152 as a consequence of the spatial bottlenecks formed by the central holes 158, 160 in the centers of separation rings 154, 156 which are additionally filled with the respective sections of the lamp 128, convection is significantly reduced between the chambers 148, 150, 152. Advantageously, this prevents an undesired accumulation of heat in particular in the lowermost chamber 152, and therefore protects first electric terminal 108 against overheating.

The staggered chamber arrangement of FIG. 5 involves the separation rings 154, 156 which prevent an overheating at the bottom side. Descriptively speaking, the separation rings 154, 156 shield electromagnetic radiation from an upper side towards a lower side. The chambers 148, 150, 152 form poorly thermally conductive separate gas cushions. This geometry forms three protection volumes suppressing convection between or at least separating convection inside of the individual chambers 148, 150, 152. By taking this measure, the heat transition coefficient may be reduced, and a thermal isolation feature may be provided to the lamp-housing assembly 100.

The embodiment of FIG. 2 to FIG. 7 has advantages: Self-alignment may be accomplished by the ceramic flange member 112 with spherical fit and a suitable design of the lamp housing. Tool-free installation becomes possible by implementing bayonet mechanism 120 in combination with a spring-loaded plunger. An electric contact may be established automatically by providing a respective contact spring located on a plunger. Electric isolation may be achieved by the ceramic flange member 112, and the provision of a plastic cover in form of lamp cap 104. Advantageously, a high creepage distance and a spark gap may be obtained to increase electric reliability. A heatsink function may be provided to which the thermally conductive ceramic of the flange member 112 contributes. A large surface area and a good thermal conductivity as well as the use of an air flow through a contact assembly may be advantageous. Furthermore, the described embodiment allows a force-controlled installation. A spring-loaded plunger and the bayonet mechanism 120 as well as the application of only axial loads are advantageous in this context. A lower contact spring allows a thermal expansion.

Summarizing the above description of FIG. 2 to FIG. 7, the electrically conductive contact springs 116, 116' are for providing an electrical contact. Radial alignment can be accomplished by flange member 112. Axial alignment can be accomplished via planar mounting surface 134. A preload for axial alignment may be provided by the biasing element 118.

Figure 8:
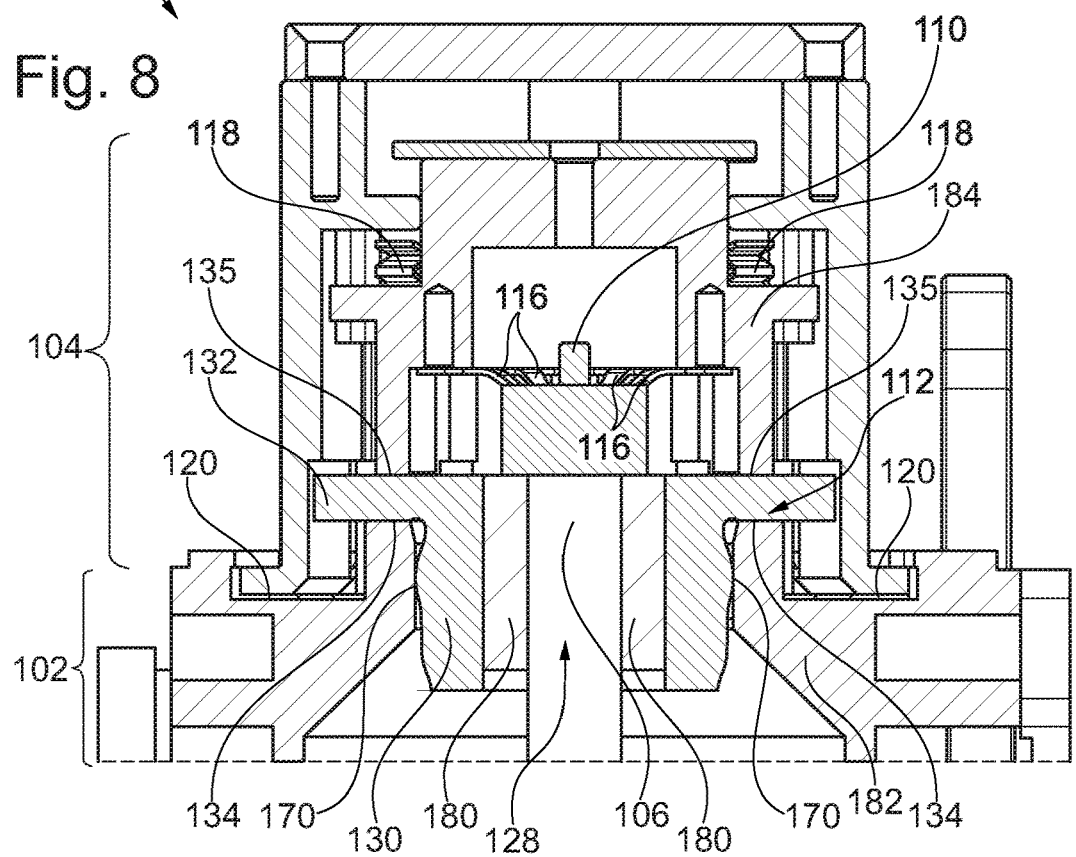
FIG. 8 shows a three-dimensional cross-sectional view of an upper portion of a lamp-housing assembly according to an exemplary embodiment of the present disclosure.

FIG. 8 shows a three-dimensional cross-sectional view of an upper portion of a lamp-housing assembly 100 according to an exemplary embodiment of the present disclosure.

FIG. 8 shows that an electrically insulating and thermally conductive glue 180 may connect lamp body 106 with flange member 112. A casing 182 may be at ground potential. Reference sign 184 indicates a contact sleeve with a contact spring which may be used for ignition (for instance with a voltage of 25 kV).

It should be noted that the term "comprising" does not exclude other elements or features and the term "a" or "an" does not exclude a plurality. Also, elements described in association with different embodiments may be combined. It should also be noted that reference signs in the claims shall not be construed as limiting the scope of the claims.

LIST OF REFERENCE SIGNS sample separation apparatus 10
fluid drive 20
mixer 23
solvent supply 25
degassing unit 27
separation unit 30
injector 40
detector 50
fractionating unit 60
control unit 70
fluidic valve 95
lamp-housing assembly 100
cuvette 101
lamp seat 102
flow channel 103
lamp cap 104
lamp body 106
excitation electromagnetic radiation beam 107
first electric terminal 108
second electric terminal 110
emission electromagnetic radiation beam 111
flange member 112
top-sided set of annular electrically conductive contact springs 116
bottom-sided set of annular electrically conductive contact springs 116'
biasing element 118
bayonet mechanism 120
cooling openings 122
cooling body 124
operation lever 126
lamp 128
sleeve section 130
disc-shaped section 132
mounting surface 134
mounting surface 135
engagement structure 140
engagement structure 142
flow cell 143
lamp seat-sided portion 144
lamp cap-sided portion 146
staggered chambers 148, 150, 152
separation ring 154, 156
central hole 158, 160
electrodes 162, 164
filler plug 166
electric field adjusting wire 168
convex section 170
electrically insulating and thermally conductive glue 180
casing 182
light emitting portion 183
contact sleeve 184
cooling gas flow 186
accommodation volumes 187, 189
metallic member 188
inlet monochromator 192
emission monochromator 194
detecting unit 196

The invention claimed is:

1. A lamp-housing assembly for a detector of a sample separation apparatus for separating a fluidic sample, the lamp-housing assembly comprising:
a lamp seat comprising a first contact member;
a lamp configured to be inserted into the lamp seat along an insertion axis, the lamp comprising a lamp body, and a first electric terminal and a second electric terminal disposed at axially opposing ends of the lamp body on the insertion axis; and
a lamp cap configured to be mounted on the lamp seat and on the inserted lamp, the lamp cap comprising a second contact member, wherein:
the lamp and the lamp seat are configured such that inserting the lamp into the lamp seat establishes an electric coupling of the first electric terminal with the first contact member;
the lamp and the lamp cap are configured such that mounting the lamp cap on the lamp seat and on the inserted lamp establishes an electric coupling of the second electric terminal with the second contact member; and
the lamp seat, the lamp and the lamp cap are matched with respect to each other such that, by inserting the lamp into the lamp seat and by mounting the lamp cap on the lamp seat and on the inserted lamp, the lamp is axially and radially aligned and electrically and thermally coupled with the lamp seat and the lamp cap.

2. The lamp-housing assembly according to claim 1, wherein the lamp comprises a thermally conductive and electrically insulating flange member arranged on the lamp body, wherein the flange member is configured to enhance an electric isolation of the first electric terminal with respect to the second electric terminal, and is further configured to remove heat from the lamp body.

3. The lamp-housing assembly according to claim 2, comprising at least one of the following features:
wherein the flange member comprises a ceramic;
wherein the flange member comprises a sleeve section surrounding part of the lamp body and a disc-shaped section providing at its bottom side a mounting surface to rest on the lamp seat;
wherein the flange member rests on the lamp seat at a position between the first electric terminal and the second electric terminal;
wherein the flange member, the lamp seat and/or the lamp cap is or are configured so that, by inserting the lamp into the lamp seat and by mounting the lamp cap on the lamp seat and on the inserted lamp, a continuous thermally conductive path is established between the flange member and at least one of the lamp seat and the lamp cap;
wherein the flange member has an engagement structure and the lamp seat has a matching further engagement structure, and the engagement structure and the further engagement structure are configured such that a mutual engagement between the engagement structure and the further engagement structure upon inserting the lamp into the lamp seat fixes the lamp at the lamp seat in a target angular position.

4. The lamp-housing assembly according to claim 1, comprising at least one of the following features:
the first contact member comprises a set of annular contact springs;
the second contact member comprises a set of annular contact springs.

5. The lamp-housing assembly according to claim 1, wherein the lamp is configured as a high-voltage lamp or a gas discharge lamp.

6. The lamp-housing assembly according to claim 1, wherein the lamp seat and the lamp are formed with matching shape so that inserting the lamp in the lamp seat leads to a self-alignment between the lamp seat and the lamp.

7. The lamp-housing assembly according to claim 1, comprising at least one of the following features:
   wherein the lamp comprises a flange member arranged on the lamp body, and the lamp-housing assembly further comprises a force-controlling biasing element configured to bias the flange member to apply an axial preload to the flange member;
   comprising a bayonet mechanism, wherein the lamp seat and the lamp cap are configured to be connectable with each other by the bayonet mechanism;
   wherein at least one of the lamp seat and the lamp cap has one or more cooling openings configured to enable a flow of cooling fluid through the lamp-housing assembly;
   wherein the lamp comprises a flange member arranged on the lamp body, and wherein at least one of the lamp seat and the lamp cap has one or more cooling openings, and wherein the flange member, the lamp seat and/or the lamp cap is or are configured so that thermal energy created by the lamp is dissipated along a continuous thermally conductive path and through the one or more cooling openings;
   comprising a cooling body integrally formed with the lamp seat or coupled with the lamp seat and configured to remove heat;
   wherein the lamp cap comprises an operation lever operable by a user for assembling or disassembling the lamp cap with respect to the lamp seat;
   wherein the lamp seat, the lamp and the lamp cap are configured such that assembly and/or disassembly of the lamp-housing assembly by a user is enabled in a toolless and/or single-handed way.

8. A lamp-housing assembly for a detector of a sample separation apparatus for separating a fluidic sample, the lamp-housing assembly comprising:
   a lamp seat comprising a lamp-seat accommodation volume;
   a lamp configured to be inserted into the lamp seat; and
   a lamp cap configured to be mounted on the lamp seat and on the inserted lamp and comprising a lamp-cap accommodation volume, wherein:
   a lamp seat-sided portion of the lamp is arranged in the lamp-seat accommodation volume, and a lamp cap-sided portion of the lamp is arranged in the lamp-cap accommodation volume;
   the lamp-seat accommodation volume and the lamp-cap accommodation volume are different and separated from each other; and
   the lamp-seat accommodation volume is divided into at least two convection-inhibited separated staggered chambers.

9. The lamp-housing assembly according to claim 8, wherein the lamp-seat accommodation volume is divided into three convection-inhibited separated staggered chambers.

10. The lamp-housing assembly according to claim 8, wherein adjacent ones of the at least two convection-inhibited separated staggered chambers are separated by a respective thermally conductive separation ring having a central hole for accommodating a respective portion of the lamp.

11. The lamp-housing assembly according to claim 8, comprising an interface disposed between and separating the lamp-seat accommodation volume and the lamp-cap accommodation volume, wherein the interface is substantially gap-free and/or mutually sealed by at least one sealing.

12. The lamp-housing assembly according to claim 8, wherein the at least two convection-inhibited separated staggered chambers are staggered along a staggering direction which corresponds to an axis extending between opposing ends of the lamp.

13. The lamp-housing assembly according to claim 8, wherein the lamp-seat accommodation volume and the lamp-cap accommodation volume are hermetically shielded with respect to each other.

14. The detector of claim 1, configured to detect the separated fluidic sample, the detector comprising:
   the lamp-housing assembly, wherein the lamp is configured to emit primary electromagnetic radiation for illuminating the separated fluidic sample; and
   a detection unit configured to detect secondary electromagnetic radiation emitted from the separated fluidic sample.

15. The detector according to claim 14, comprising at least one of the following features:
   wherein the detector is a fluorescence detector;
   wherein the detector comprises a flow cell through which the separated fluidic sample flows, and which is illuminated by the primary electromagnetic radiation emitted from the lamp.

16. A lamp for a detector of a sample separation apparatus for separating a fluidic sample, the lamp comprising:
   a lamp body;
   a first electric terminal and a second electric terminal disposed at axially opposing ends of the lamp body; and
   a thermally conductive and electrically insulating flange member arranged on the lamp body, wherein the flange member is configured to enhance an electric isolation of the first electric terminal with respect to the second electric terminal and is further configured to remove heat from the lamp body.

17. A sample separation apparatus for separating a fluidic sample, the sample separation apparatus comprising:
   a fluid drive configured for driving the fluidic sample and/or a mobile phase in which the fluidic sample is injected;
   a sample separation unit for separating the fluidic sample in the mobile phase; and
   the lamp-housing assembly according to claim 1.

18. The sample separation apparatus according to claim 17, further comprising at least one of the following features:
   the sample separation apparatus is configured as a chromatography sample separation apparatus;
   the sample separation unit is a chromatographic separation column;
   comprising an injector configured to inject the fluidic sample into the mobile phase;
   comprising a fractionating unit configured to collect the separated fluidic sample;
   comprising a degassing apparatus configured to degas at least part of the mobile phase.

19. A method of assembling the lamp-housing assembly according to claim 1, the method comprising:
   inserting the lamp into the lamp seat; and mounting the lamp cap on the lamp seat and on the inserted lamp.

\* \* \* \* \*